3,467,720
PROCESS FOR THE PRODUCTION OF
CYCLOHEXENOL
Ferdinand List and Helmut Alfs, Marl, Germany, assignors
to Chemische Werke Huls A.G., Marl, Germany
No Drawing. Filed Mar. 30, 1966, Ser. No. 538,617
Claims priority, application Germany, Apr. 6, 1965,
C 35,517
Int. Cl. C07c 35/14
U.S. Cl. 260—617                                                 17 Claims

ABSTRACT OF THE DISCLOSURE

In a process for producing cyclohexanol by hydrogenating cyclohexenol, the improvement comprising producing the cyclohexenol by oxidizing cyclohexene with oxygen at 40–60° C. in the presence of not more than about 1% of a first soluble heavy metal salt to convert about 5–30% of the cyclohexene to cyclohexenyl hydroperoxide; and then reacting the cyclohexenyl hydroperoxide with unconverted cyclohexene in the presence of an additional quantity of 1–5% by weight of a second soluble heavy metal salt, thereby forming approximately two mols of cyclohexanol from one mol of cyclohexenyl hydroperoxide and one mol of cyclohexene.

---

The present invention relates to a process for the hydration of olefins to produce alcohols and more particularly to an improvement in the process of converting cyclohexene into cyclohexanol.

Cyclohexanol is important not only as an intermediate product for the manufacture of polyamides such as nylon 6—6 and for esters usable as plasticizers, but also is directly useful, for example, as a solvent for lacquers and waxes.

A number of processes for the production of cyclohexanol are known. For example, phenol, in the gaseous or liquid phase is hydrogenated to form cyclohexanol. It is also possible to hydrogenate nitrobenzene to form cyclohexylamine, and to react the latter on a hydrogenation catalyst with steam. In this process, however, cyclohexanone is obtained along with cyclohexanol. Cyclohexanol is also produced by catalytic oxidation of cyclohexane with air, but here a mixture of cyclohexane with cyclohexanone and various acids and esters is produced.

Cyclohexene is now readily available as a starting material by means of various processes, for example, by the method of U.S. Patent 2,186,370 (dehydrochlorination of monochlorocyclohexane, using aluminum silicate on bleaching earth as catalysts at a temperature between 130 and 140° C.) or by the method of German patent application R 2,362,120, 1947 (dehydrogenation of cyclohexane in the presence of halogens, using aluminum oxide as catalyst at temperatures above 300° C.).

According to prior art French Patent 700,067 and U.S. Patent 2,414,646, the disclosures of which are incorporated herein, cyclohexene is esterified with acid, such as sulfuric acid, and the ester is subsequently saponified. From the reaction mixture resulting therefrom, cyclohexanol is separated. The alcohol obtained, however, has a large proportion of water which must be separated by a distillation step, as extraction and salting out processes are technically unsatisfactory and uneconomical. Additionally, the sulfuric acid causes problems by its corroding effect, and there are undesired polymerization and etherification side reactions.

The limitations of the prior art include the absence of an efficient process permitting the production of cyclohexanol from cyclohexene in a simple manner without the problems resulting from corrosion, problems connected with the further processing of the product, and those associated with the occurrence of side reactions.

According to the present invention, hydrocarbons such as cycloalkenes, are oxidized to cycloalkenyl hydroperoxides by a molecular oxygen-containing gas in the presence of up to 1, preferably 0.01 to 0.1% by weight, of a heavy metal salt based on the hydrocarbon weight. Any catalyst inactivated during the reaction is supplemented in such a manner that the velocity of oxygen absorption remains substantially constant. Preferably, the oxidation is conducted until 5–30% of the hydrocarbon employed is converted.

The oxidation is extraordinarily accelerated in this process, without any appreciable occurrence of those peroxide decomposition reactions known in the prior art wherein the decomposition is caused by the heavy metal salts. Also the velocity of formation of the hydroperoxide is greater by up to a power of ten than in the previously known oxidation processes even though very mild temperatures are maintained.

A particularly pure product is obtained which is substantially, if not completely, devoid of undesired by-products, such as water and acid. In this connection, it is particularly important to avoid exceeding the 1% threshold value of the heavy metal salt concentration during the oxidation reaction, since the peroxide decomposes to an increasing degree, and a decrease in yield occurs with the formation of water and acidic compounds.

Hydrocarbons particularly suitable for conversion to hydroperoxides by the methods of the present invention are: cyclohexene to cyclohexenyl hydroperoxide, 1-methylcyclohexene to 1-methylcyclohexenyl hydroperoxide, 1,2-dimethylcyclohexene to 1,2-dimethylcyclohexenyl hydroperoxide, cyclododecene to cyclododecenyl hydroperoxide, cyclododecatriene to cyclododecatrienyl hydroperoxide, cyclopentene to cyclopentenyl hydroperoxide, etc.

Moreover, it is possible to convert even aliphatic olefins to the corresponding hydroperoxides, as for example dodecene to dodecenyl hydroperoxide, 2-ethylhexene-1 to 2-ethylhexen-1-yl hydroperoxide, 2-methylbutene to 2-methylbutenyl hydroperoxide, etc.

A surprising discovery of the present invention is the production of cyclohexanol from cyclohexene in a very advantageous manner. Cyclohexene is oxidized with an oxygen-containing gas at 50–60° C. in the presence of up to 1% by weight of a dissolved heavy metal salt and with 5–30% conversion to cyclohexenyl peroxide. The cyclohexenyl hydroperoxide is subsequently decomposed in the presence of the unconverted cyclohexene with an additional quantity of 1 to 5% by weight, based on the peroxide, of a soluble heavy metal salt added in several small batches. The thus-formed cyclohexenol is separated; and the cyclohexenol is then hydrogenated in a conventional manner.

It is an object of the present invention to provide improved processes for the production of unsaturated cyclic hydrocarbon hydroperoxides, cycloalkenols, and cycloalkanols.

A particular object of the present invention is an improved process for the conversion of cyclohexene to cyclohexanol.

Another object of the invention is the conversion of cyclohexene to cyclohexenyl hydroperoxide.

Still another object of the invention is the conversion of cyclohexenol hydroperoxide to cyclohexene in the presence cyclohexene.

A further object is the hydrogenation of cyclohexenol to cyclohexanol.

Still further objects and the broad scope of the invention will become obvious from a consideration of the disclosure, examples and claims which follow.

It is to be understood that this invention is applicable to the conversion of cycloalkenes in general to their corresponding hydroperoxides and cycloalkanols. For purposes of illustration, however, the following description refers to the production of cyclohexanol.

According to the present invention cyclohexene is converted to cyclohexanol by the following process steps:

(1) Cyclohexene is oxidized at 40–60° C. with an oxygen-containing gas in the presence of up to 1% by weight of a dissolved heavy metal salt producing a 5–30%, preferably 10–25%, conversion to cyclohexenyl hydroperoxide;

(2) The cyclohexenyl hydroperoxide is decomposed in the presence of unconverted cyclohexene by the addition of small portions of 1 to 5% by weight soluble heavy metal salt per weight of peroxide and cyclohexenol is formed;

(3) The cyclohexenol is separated; and (4) The cyclohexenol is hydrogenated to cyclohexanol.

In this process step, i.e., the partial oxidation of the cyclohexene, is accomplished preferably at 0 to 10 atmospheres pressure absolute and preferably at a temperature of 50–60° C. The reactor is preferably an oxidation tower having an air inlet at the bottom, or an agitated vessel having an air inlet through the agitating shaft may be used. Preferred materials of construction for the reactor are glass, enamel, or vanadium steel. The preferred oxidation agent is air but it is also possible to employ pure oxygen, or any molecular oxygen-containing gases. The oxygen-containing gas can be introduced at a rate of 2 mols of oxygen per 12 mols of cyclohexene per hour. In general, the rate of introduction is a function of the amount of cyclohexene starting material, but it is not limited to the named preferred rate.

Suitable heavy metal salts are, for example, the salts of copper, tin, mercury, lead, bismuth, iron, cobalt manganese, molybdenum, and nickel, with various acids, for example, carboxylic acids such as benzoic acid, tert. butyl-benzoic acid, naphthenic acids, octenic acid and cuminic acid. Preferably the lead and cobalt salts of the above-mentioned acids are used, because they have a particularly advantageous catalytic effect. These particularly advantageous heavy metal salts are lead benzoate, lead tert. butyl-benzoate, lead naphthenate, lead octenate, lead cuminate, cobalt benzoate, cobalt tert. butyl-benzoate, cobalt naphthenate, cobalt octenate and cobalt cuminate. The function of the anionic portion of the heavy metal salt is to make it soluble in the cycloalkene starting material; consequently, an organic anion is preferred.

The first process step yields a solution of cyclohexenyl hydroperoxide in cyclohexene, the concentration of said solution being in parts by weight 5 to 40, preferably 8 to 25 parts of the hydroperoxide to 100 parts of cyclohexene.

In the second step of the process of this invention, the cycloalkenyl peroxide is decomposed to the corresponding cycloalkenyl alcohol.

Whereas the reduction of cyclohexenyl hydroperoxide by means of sodium sulfite is known, in such a process, cyclohexenol is produced in yields of up to 95%, based on the peroxide quantity employed. It is likewise possible to decompose the cyclohexenyl hydroperoxide, for example, with a dilute base, but in that process, only 55% cyclohexenol, based on the converted cyclohexene, is obtained.

In the novel process of the present invention, however, cyclohexenyl hydroperoxide is used to produce 200% of cyclohexenol, as follows:

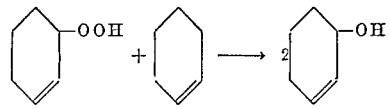

Thus, the new and unexpected results of the present invention include not only overcoming the difficulties of hydroperoxide decomposition by the heavy metal salts into a plurality of undesired by-products, but there is also obtained, in a highly advantageus manner, a doubling of the yield known in the prior art.

Essential to the success of the process is the further addition of a total of 1–5, preferably 1 to 3% by weight based on the hydroperoxide, of a soluble heavy metal salt. It is important, to obtain the best results, to add said salt in small portions so that in place of a sudden decomposition, a mildly exothermic decomposition of the cyclohexenyl peroxide is ensured with the decomposition taking place during the entire reaction time. For example, about 100 mg. to 1 g., preferably 100 mg. to 300 mg. small substantially equal batches of the soluble heavy metal salt are added at substantially equal intervals during a reaction time of about 1 to 20, preferably 2 to 12 hours. A continuous feeding of the salt during the entire reaction is, of course, the most preferred technique. For this purpose, a solution of cobalt naphthenate, e.g., is dropped in at a feed rate, that prevents the reaction temperature from rising above approximately 30° C.

Suitable heavy metal salts are those usable for the cyclohexene oxidation step. Preferably, such salts of heavy metals in this step are the cobalt salts. It is preferred, but not necessary, to use the same heavy metal salts in both steps.

The decomposition takes place at temperatures between 20 and 50° C., preferably at about 30° C.

In order to achieve as uniform a reaction as possible, the mixture is preferably agitated during the reaction.

Conducting the reaction in the presence of a drying agent has proved particularly advantageous since traces of water inhibit the desired reaction procedure. Suitable drying agents include, for example, sodium sulfate, aluminum oxide, and silica gel. Many additional drying agents can be selected from handbooks, the main criterion being that they absorb or adsorb water, and do not deleteriously interfere with the reaction, being preferably inert under the reaction conditions.

The reaction is generally conducted until the peroxide-oxygen content has increased to below 0.3%. This content is determined iodometrically in accordance with known procedures.

The novel decomposition process results, under the above-disclosed conditions, in a yield of above 90%. This means that a reaction product containing about 300 g. cyclohexenol per kilogram is obtained. For example, from a 13% cyclohexene conversion in 1 to 1.5 hours to a 16% solution of the peroxide in cyclohexene, the total conversion of cyclohexene is 26%.

The cyclohexene-containing cyclohexenol is now further processed, depending upon the desired final product. After the hydrocarbon has been separated it is possible to convert the cyclohexenol into cyclohexanone.

Preferably, in accordance with the purpose of the present invention, the cyclohexene is separated, for example in a thin-film evaporator, and the unsaturated alcohol is hydrogenated to form cyclohexanol in a conventional manner, such as the processes disclosed in Kirk and Othmer, Encyclopedia of Chemical Technology, vol. 7 (1951), pp. 692–710.

The cyclohexanol produced by the present process is distinguished by its very particular purity (above 99%).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

In a glass tower of about 1 m. in height and a diameter of 50 mm., provided with an external heating device in its wall, an air inlet frit, a catalyst chute, a temperature measuring device, a measuring device for the incoming and exiting gas, as well as a magnetic oxygen measuring device in the exit passage for the gas, there are provided 1000 grams cyclohexene containing 100 mg. of cobalt naphthenate (Soligen cobalt, where Soligen is a trademark for naphthenate of cobalt, lead, zinc, etc.)

Through the frit, for a period of 1.5 hours at 55° C. and 0 atmospheres gage pressure, 300 liters/hour of air are conducted through the reaction mixture. The fresh catalyst is charged at a rate of 0.2 gram/hour. The waste gas comprises 88.0% by volume carbon dioxide and there is no carbon monoxide present. The reaction product of 1020 grams has an acid number of 0.7 and contains 2 grams water, as well as 16% peroxide.

The reaction product obtained in the previous reaction step (1020 grams) is first agitated with 50 grams anhydrous sodium sulfate at 30° C. for 12 hours. During the agitation, a total of 5 grams cobalt naphthenate is added in small equal batches. By cooling, or by gentle heating, the temperature is maintained constant during the entire duration of the reaction.

The reaction product from the decomposition step contains 0.2% peroxide and has an OH number of 140 and an acid number of 1.3.

The reaction product obtained in the preceding reaction step is separated in a thin-film evaporator into cyclohexene and cyclohexenol. The latter (280 grams) is hydrogenated under agitation at 60° C. and 300 atmospheres excess pressure with 20 grams Raney nickel, for 3 hours. This hydrogenation is conducted without solvents, or in the presence of about 300 grams cyclohexane or methanol. The hydrogenation product from which the Raney nickel has been removed has an OH number of 142 and an acid number of 0. The product (B.P.$_7$=48° C.) distilled over a 30 cm. column yields, in addition to a residue of 29 grams, a main run of 261 grams.

A gas-chromatographical analysis indicates a 99.1% cyclohexanol yield with 0.5% cyclohexane epoxide and 0.4% by-products in addition. The yield amounts to 91.3% of theoretical based on 2 mols cyclohexanol per mol of hydroperoxide.

EXAMPLE 2

1000 grams of cyclohexene are oxidized in the apparatus described in connection with Example 1, with 200 mg. lead p-tert.butyl-benzoate used. Within 1.5 hours, 300 mg. lead salt are added dropwise. There is obtained a water-free reaction product with 14% cyclohexene hydroperoxide (acid number=0.04).

The further reaction and processing steps are accomplished as in Example 1.

EXAMPLE 3

If, in place of cobalt naphthenate, manganese naphthenate is used in Example 1, there are obtained peroxide and cyclohexanol in approximately the same yields.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for converting cyclohexene to cyclohexenol comprising:
    (a) oxidizing cyclohexene with an oxygen-containing gas at a temperature of about 40–60° C. in the presence of not more than about 1% by weight of a first soluble heavy metal salt of a carboxylic acid to convert about 5–30% of said cyclohexene to cyclohexenyl hydroperoxide;
    (b) decomposing said cyclohexenyl hydroperoxide in the presence of unconverted cyclohexene and an additional quantity of about 1 to 5% by weight of a second soluble heavy metal salt of a carboxylic acid per weight of said hydroperoxide to form cyclohexenol; and
    (c) separating resultant cyclohexenol from the reaction milieu of step (b).

2. The process of claim 1 wherein the decomposing reaction of step (b) is conducted in the presence of a drying agent to eliminate water from the reaction.

3. The process of claim 1 wherein said second soluble heavy metal salt is added in small portions.

4. The process of claim 1 wherein said first and second soluble heavy metal salts are the same.

5. The process of claim 1 wherein the concentration of said first soluble heavy metal salt of (a) is about 0.01 to 0.1% by weight.

6. The process of claim 1 wherein about 10 to 20% of said cyclohexene is converted to cyclohexenyl hydroperoxide.

7. The process of claim 1 wherein about 10 to 25% of said cyclohexene is converted to cyclohexenyl hydroperoxide.

8. The process of claim 1 wherein step (a) takes place at a temperature of about 50–60° C.

9. The process of claim 1 wherein step (a) is conducted at a pressure of about 0 to 10 atmospheres absolute.

10. The process of claim 1 wherein said oxygen-containing gas is air.

11. The process of claim 1 wherein said first soluble heavy metal salt is selected from the group consisting of lead benzoate, lead tert.butyl-benzoate, lead naphthenate, lead octenate, lead cuminate, cobalt benzoate, cobalt tert.butyl-benzoate, cobalt naphthenate, cobalt octenate and cobalt cuminate.

12. The process of claim 1 wherein said second soluble heavy metal salt is selected from the group consisting of cobalt benzoate, cobalt tert.butyl-benzoate, cobalt naphthenate, cobalt octenate and cobalt cuminate.

13. The process of claim 1 wherein step (a) is continued for a period of about 1 to 1.5 hours and step (b) is continued for a period of up to about 15 hours.

14. The process of claim 1 wherein said first and second soluble heavy metal salts are different.

15. The process of claim 11 wherein said second soluble heavy metal salt is selected from the group consisting of cobalt benzoate, cobalt tert.butyl-benzoate, cobalt naphthenate, cobalt octenate and cobalt cuminate.

16. A process for converting cyclohexene to cyclohexenol, which process comprises reacting one mol of cyclohexene with one mol of cyclohexenyl hydroperoxide in the presence of about 1–6% of a soluble heavy metal salt of a carboxylic acid, based on the weight of the hydroperoxide, to yield about two mols of cyclohexenol.

17. A process as defined by claim 16 wherein the reaction is conducted in the presence of a drying agent to eliminate water from the reaction.

(References on following page)

References Cited

UNITED STATES PATENTS

| | | | |
|---|---|---|---|
| 2,223,500 | 12/1940 | Scott et al. | 260—631 |
| 2,974,161 | 3/1961 | Keith et al. | 260—631 |
| 3,171,864 | 3/1965 | Clement et al. | |

FOREIGN PATENTS

| | | |
|---|---|---|
| 700,546 | 12/1953 | Great Britain. |
| 1,292,244 | 3/1962 | France. |

OTHER REFERENCES

N. G. Ariko et al., Sbornik Nauch. Rabot, Inst. Fiziko-Org. Khimii, Akad. Nauk. Belorus, S.S.R., No. 8, 155–60 (1960).

Z. G. Kozlova et al., (Inst. Chem. Phys. Moscow) (Kineticai Kataliz, vol. 5, pp. 868–76), Translation: Kinetics and Catalysis, pp. 759–66, vol. 5, 1964.

Criegee, Ann. der Chemie, Band 481, Heftz, pp. 281–5 (1930).

BERNARD HELFIN, Primary Examiner.

M. W. GLYNN, Assistant Examiner

U.S. Cl. X.R.

260—610, 631, 632